United States Patent
Issartel et al.

(10) Patent No.: US 10,585,399 B2
(45) Date of Patent: Mar. 10, 2020

(54) METHOD FOR PRODUCING A TIMEPIECE COMPONENT PROVIDED WITH AN INSERT MADE OF A COMPOSITE MATERIAL, AND ASSOCIATED TIMEPIECE COMPONENT AND TIMEPIECE

(71) Applicant: ROLEX SA, Geneva (CH)

(72) Inventors: Jean-Paul Issartel, Cranves-Sales (FR); Alexandre Oliveira, Amancy (FR)

(73) Assignee: ROLEX SA, Geneva (CH)

( * ) Notice: Subject to any disclaimer, the term of this patent is extended or adjusted under 35 U.S.C. 154(b) by 393 days.

(21) Appl. No.: 15/301,608

(22) PCT Filed: Apr. 2, 2015

(86) PCT No.: PCT/EP2015/057395
§ 371 (c)(1),
(2) Date: Oct. 3, 2016

(87) PCT Pub. No.: WO2015/150552
PCT Pub. Date: Oct. 8, 2015

(65) Prior Publication Data
US 2017/0038734 A1    Feb. 9, 2017

(30) Foreign Application Priority Data

Apr. 4, 2014    (EP) .................................... 14163597

(51) Int. Cl.
*G04B 37/22*       (2006.01)
*G04B 19/12*       (2006.01)
(Continued)

(52) U.S. Cl.
CPC .......... *G04B 37/22* (2013.01); *B23K 26/0624* (2015.10); *B23K 26/355* (2018.08); *G04B 19/12* (2013.01); *G04B 3/04* (2013.01)

(58) Field of Classification Search
CPC .......... G04B 37/22; G04B 19/12; G04B 3/04; B23K 26/355; B23K 26/0624
See application file for complete search history.

(56) References Cited

U.S. PATENT DOCUMENTS 5,558,789 A * 9/1996 Singh ..................... C04B 41/53
                                                         219/121.69
6,599,613 B1* 7/2003 Kasahara ............... G01D 13/02
                                                              428/140
(Continued)

FOREIGN PATENT DOCUMENTS

| EP | 2 380 864 A1 | 10/2011 |
| WO | 2013/135703 A1 | 9/2013 |
| WO | 2013/178412 A1 | 12/2013 |

OTHER PUBLICATIONS

Zehetner et al. "Facilitating the fabrication of micron scale composite polymer inlays in ceramics substrates using femtosecond pulse laser ablation technique", 12th Conference on Laser Ablation, Oct. 6-11, 2013 (1 page); cited in the ISR and Specification.
(Continued)

*Primary Examiner* — Nahida Sultana
(74) *Attorney, Agent, or Firm* — Westerman, Hattori, Daniels & Adrian, LLP

(57) ABSTRACT

The invention relates to a method comprising a step (E0) of forming a body provided with a cavity on a face of said body, a treatment step (E2) consisting of forming, on said body, at least one reinforced adhesion area which is at least partially outside the cavity, and a step (E3) of depositing composite material. During the deposition step (E3), the cavity is filled and the reinforced adhesion area is covered with the composite material.

17 Claims, 2 Drawing Sheets

(51) Int. Cl.
*B23K 26/0622* (2014.01)
*B23K 26/352* (2014.01)
*G04B 3/04* (2006.01)

(56) References Cited

U.S. PATENT DOCUMENTS

| | | | | |
|---|---|---|---|---|
| 8,585,956 | B1* | 11/2013 | Pagryzinski | B41M 5/267 |
| | | | | 264/400 |
| 9,423,772 | B2* | 8/2016 | Fernandez Ciurleo | |
| | | | | C04B 41/89 |
| 2004/0002199 | A1* | 1/2004 | Fukuyo | B23K 26/03 |
| | | | | 438/460 |
| 2005/0211680 | A1* | 9/2005 | Li | A61F 2/0077 |
| | | | | 219/121.68 |
| 2009/0179352 | A1* | 7/2009 | Chen | B29C 33/76 |
| | | | | 264/400 |
| 2011/0032968 | A1* | 2/2011 | Kopf | H01S 3/08059 |
| | | | | 372/98 |
| 2011/0259753 | A1 | 10/2011 | Grossenbacher et al. | |
| 2013/0272100 | A1* | 10/2013 | Klinger | G04D 7/004 |
| | | | | 368/175 |
| 2013/0308430 | A1* | 11/2013 | Verardo | G04D 7/085 |
| | | | | 368/200 |
| 2015/0023141 | A1* | 1/2015 | Edmondson | G04B 19/12 |
| | | | | 368/238 |
| 2015/0049593 | A1 | 2/2015 | Oliveira | |
| 2015/0122774 | A1 | 5/2015 | Ciurleo et al. | |
| 2017/0255166 | A1* | 9/2017 | Suzuki | B29C 33/42 |
| 2018/0369956 | A1* | 12/2018 | Anasenzl | C09J 5/02 |

OTHER PUBLICATIONS

International Search Report and Written Opinion dated Aug. 5 2015 issued in corresponding application No. PCT/EP2015/057395; w/ English partial translation and partial machine translation (24 pages).

* cited by examiner

METHOD FOR PRODUCING A TIMEPIECE COMPONENT PROVIDED WITH AN INSERT MADE OF A COMPOSITE MATERIAL, AND ASSOCIATED TIMEPIECE COMPONENT AND TIMEPIECE

The present invention relates to a method for producing a timepiece component.

In the field of horology, it is customary to produce external elements of a timepiece component which incorporate inserts made of a composite material, for example in order to form graduations, a commercial denomination, a trade mark symbol or some other decorative feature. The composite material comprises, for example, binding agents and ceramic particles. It may optionally be charged with pigments made of a luminescent material or some other functional material. The inlaid timepiece component may be a case, a bezel, a dial, a bracelet, a component of a timepiece movement, etc. It is made of a substrate material, such as a ceramic, a metal alloy or sapphire.

A previously disclosed method for producing such an inlaid timepiece component initially involves the formation of a body from a substrate material made of a ceramic, for example by sintering a preformed green body. A cavity is then formed in one face of the body, for example by laser ablation, and is filled with a composite material. The latter is then polymerized by heating in order to an insert material possessing sufficient hardness. Finally, the method comprises a finishing step by polishing, in the course of which the surplus of composite material is eliminated and an attractive appearance is imparted to the face of the inlaid body.

The adhesion between the substrate material and the composite material in the interior of the cavity is generally problematical, in particular during polymerization, which causes shrinkage of the composite material.

A previously disclosed solution for improving the adhesion between the substrate material and the composite material involves the modification of the surface state of the bottom of the cavity, for example by forming a regular network of microcones by means of a femtosecond pulse laser ablation technique ("*Facilitating the fabrication of micron scale composite polymer inlays in ceramics substrates using femtosecond pulse laser ablation technique*", J. Zehetner, S. Stroj, G. Zanghellini; 12th Conference on Laser Ablation, 6-11.10.2013, Ischia, Italy).

The present invention further improves the situation.

For this purpose, the invention relates to a method for producing a timepiece component provided with an insert made of a composite material, comprising the following successive steps:
  a step of forming a body provided with a cavity on one face of said body;
  a treatment step, in the course of which at least one reinforced adhesion zone is formed on said body;
  a step of depositing composite material, in the course of which the cavity is filled and the reinforced adhesion zone is covered with said composite material;
  a step of polymerization of the composite material;
  wherein said reinforced adhesion zone is, at least partially, outside the cavity.

The purpose of the reinforced adhesion zone is to ensure improved attachment of the material to the body of the timepiece component. According to invention, the adhesion of a zone of the body that is situated on the outside of the cavity is reinforced. The zone in this case, for example, is a zone of the face of the body including the cavity, which extends in proximity to the latter. In the course of the addition of composite material, the cavity is filled by causing the material to overflow in such a way as to cover the reinforced adhesion zone. In the course of polymerization, thanks to the improved attachment of the composite material in the area of said external zone, the shrinkage of the composite is substantially limited.

According to one particular embodiment, the reinforced adhesion zone is obtained by modification of the surface state of a surface zone of the body in such a way as to obtain a zone having a reinforced attachment texture.

According to the invention, the surface state, in particular the texture, of a surface zone of the body of the timepiece component is modified in such a way as to reinforce the adhesion of said zone.

Advantageously, the method comprises a finishing step, in the course of which any surplus of composite material is eliminated and the reinforced adhesion zone external to the cavity is suppressed.

Any excess of deposited composite material, in particular having overflowed from the cavity, is then eliminated, for example by polishing. The external zone of reinforced attachment texture is similarly caused to disappear, for example, likewise by polishing.

Advantageously, in the course of the treatment step, at least one reinforced adhesion zone is formed, which zone extends to the interior of the cavity, in particular on at least one part of the bottom of the cavity and/or on at least one part of the lateral walls of the cavity.

The one or more internal reinforced adhesion zones may extend on at least one part of the bottom of the cavity and/or on at least one part of the lateral walls of the cavity.

Advantageously, the external reinforced adhesion zone is positioned on the edge of the cavity.

The external reinforced adhesion zone may surround the totality of the cavity, or it may occupy one or more discontinuous portions of the periphery of the cavity. In the first case, the attachment is optimal. In the second case, the treatment step and the finishing step are facilitated, and their durations are reduced.

The method may advantageously comprise all or part of the following additional characterizing features:
  the external reinforced adhesion zone exhibits a width, perpendicular to the edge of the cavity, of at least 50 µm;
  the treatment step utilizes femtosecond laser radiation;
  in the course of the treatment step, the zone to be treated is scanned by a laser beam having a laser scanning speed in a longitudinal direction and having a laser scanning step width in a lateral direction, the speed and the step width defining respectively a longitudinal overlapping rate greater than 20% and strictly less than 100% and a lateral overlapping rate strictly greater than 0% and strictly less than 100%;
  the laser scanning speed is between 10 and 3500 mm/s, preferably between 500 and 1000 mm/s;
  the laser scanning step width is between 0.001 and 0.02 mm, preferably between 0.001 and 0.005 mm;
  two laser scans are performed on the zone to be treated defined respectively by two distinct longitudinal directions of scanning which are separated one from the other by an angle greater than or equal to 10°, in particular an angle equal to or substantially equal to 90°;
  the depth of relief of the reinforced attachment texture is between 0.2 and 20 microns;

the reinforced attachment texture exhibits an average difference in roughness $R_a$ of between 0.4 and 0.6 microns;

the reinforced attachment texture exhibits an average profile height $R_z$ of between 2 and 4 microns;

the body provided with said cavity is obtained by injection of a material into a mold;

the body is constituted by one of the materials of the group including:
- a ceramic, in particular a zircon-based or aluminum-based ceramic,
- a metal alloy, in particular a steel (for example steel 904L), a copper alloy (for example brass), an alloy of gold (for example an alloy of 18 ct. gold) or an alloy of Pt (for example an alloy of Pt950), and
- sapphire.

the timepiece component is one of the elements of the group including a bezel, a case, a bracelet element, a crown, a dial, an element of a timepiece movement and a blank for a timepiece movement.

The invention also relates to:
- a component including an insert made of a composite material, housed in a cavity, wherein it includes at least one reinforced adhesion surface of the composite material extending at least partially on the exterior of the cavity; and
- a timepiece component including an insert made of a composite material, housed in a cavity, wherein said cavity includes at least one reinforced adhesion surface extending on at least one part of the bottom of the cavity and on at least one part of the flanks of the cavity.

The invention relates, finally, to a timepiece including at least one of the timepiece components defined above.

The invention will be better appreciated with the help of the following description of a particular embodiment of the method for producing a timepiece component including an insert, with reference to the accompanying drawings, in which.

The method of the invention makes it possible to produce a timepiece component 7 provided with one or a plurality of inserts 6 made of a composite material.

Figure 7:
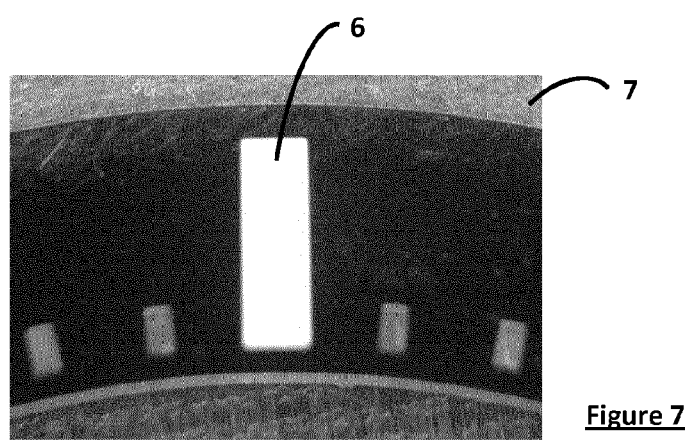
FIG. 7 depicts a part of a bezel 7, having an insert 6, produced by the method in FIG. 5.

The timepiece component 7, without claiming to be exhaustive, may be one of the following timepiece elements: a bezel, a case, a bracelet element, a crown, a dial, an element or component of a timepiece movement and a blank for a timepiece movement. A part of a bezel including an inlaid graduation 6 is depicted in FIG. 7 by way of a purely illustrative example.

The component 7 is produced from a substrate material which may be one of those contained in the following list, which is not exhaustive, however:

- a ceramic, for example on the basis of zirconium or aluminum, or of some other type;
- a metal alloy, inter alia such as a steel such as steel 904L, for example, or even such as a copper alloy such as a brass, for example, an alloy of 18 ct. gold or an alloy of Pt950;
- sapphire.

The insert 6 may be a functional element such as a graduation or an alphanumerical character, and/or a decorative or external element such as a trade mark symbol, a brand name, a commercial denomination, a hand coating, etc. It is produced in a material such as a composite material, for example, including an organic matrix, for example a dimethacrylate-based matrix, and particles of ceramic. The composite material may likewise include a charge and/or an additive having an aesthetic and/or functional role, for example a tinted charge, a light-emitting material, etc.

The method for producing an inlaid timepiece component 1 is now described with reference to FIGS. 1 to 5.

In the interest of clarity, in the particular example described here, the timepiece component 1 includes a single insert 6. The particular example described below relates specifically to the case of a substrate material made of ceramic.

Figure 1:
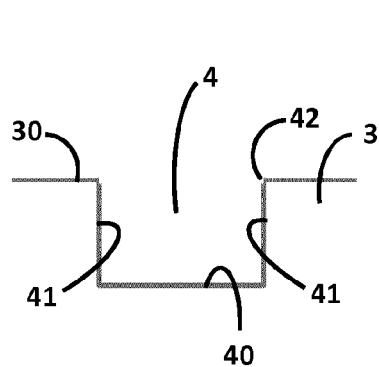
FIG. 1 depicts a cavity of the timepiece component obtained, for example, after molding by injection of a ceramic green body and before treatment of the latter by sintering.
Figure 2:
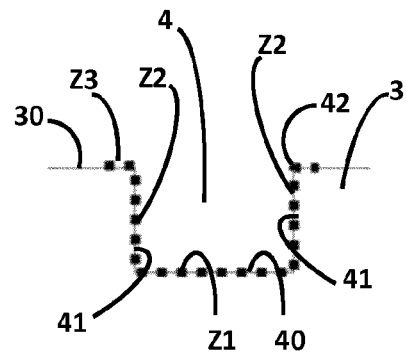
FIG. 2 depicts the cavity of the timepiece component in FIG. 1 after completion of a zone of reinforced attachment texture.
Figure 3:
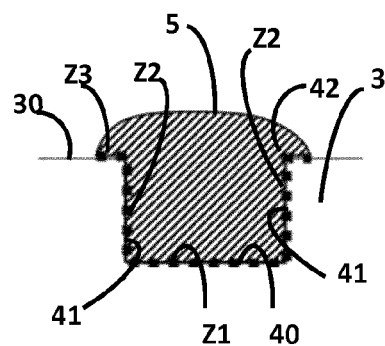
FIG. 3 depicts the cavity in FIG. 1 after filling with a composite material.
Figure 4:
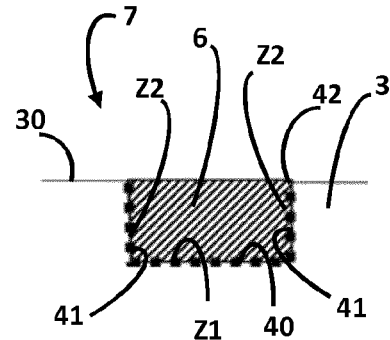
FIG. 4 depicts the cavity in FIG. 1 after finishing.

An initial step E0 comprises the formation of a body 3 of a timepiece component, as depicted partially in FIG. 1, from a substrate material, for example a zirconium-based or aluminum-based ceramic. In the particular illustrative embodiment described here, a green body is first produced by injection of the substrate material into a mold. By definition, the expression "green body" is understood here to denote a body produced from a mixture of ceramic powder and a binding agent, in the "green" state (that is to say before debinding, when the body still contains the binding agent). A blind cavity 4 is produced in a face of the body 3 directly in the course of the injection. As a variant, the cavity 4 could be formed in the body 3 after injection, for example by laser engraving or chemical etching or even by machining. The cavity 4 has a depth typically between 0.1 and 0.6 mm. It typically includes a bottom 40 and flanks, or lateral walls, 41. In the depicted example, the bottom 40 is flat and parallel to the face 30, and the walls 41 are perpendicular to the bottom 40. Of course, the bottom 40 and/or the lateral walls could be inclined or non-plane (for example convex). In particular, the flanks 41 may have a clearance angle, the latter exhibiting the advantage of benefiting the surface treatment that will be described subsequently.

The method subsequently comprises a step El for the treatment of the injected body 3 including debinding, for example by heat treatment with air, followed by sintering, for example by heat treatment at high temperature.

Other forming, machining and/or treatment techniques could be utilized, of course, in order to produce the body 3 provided with the cavity 4.

The treatment step E1 is followed by a surface treatment step E2 intended to form one or a plurality of zones having a reinforced attachment texture making it possible to increase the adhesion of the composite material constituting the insert in the body 3.

In the particular embodiment described here, the following zones having a reinforced attachment texture are formed:
- a zone Z1 extending on the bottom of the cavity 4;
- zones Z2 extending on the flanks, or lateral walls 41, of the cavity 4, and
- a zone Z3 extending on the exterior of the cavity 4, on the face 30 of the body 3, to the edge 42 of the cavity 4.

The different zones Z1, Z2 and Z3 are continuous here, that is to say they extend one after the other.

The external zone Z3 extends on the face 30, along the external edge 42 of the cavity 4. It forms an external border surrounding the totality of the cavity 4. It extends for a width, the expression "width" being understood here to denote the dimension of the zone Z3 perpendicular to the edge of the cavity 4, of at least 50 μm. Said width may nevertheless vary along the periphery of the cavity 4. As a variant, the external zone Z3 may exhibit all or part of the following characterizing features:

the external zone Z3 may extend along a part of the edge 42 of the cavity 4;

the external zone Z3 may be composed of a plurality of discontinuous portions positioned around the cavity 4;

the external zone Z3 may be slightly separated from the edge 42 of the cavity 4;

the external zone Z3 is contained within an envelope separated from the external edge of the cavity by a distance which is strictly less than the distance between the external edge of the cavity and the edge of the surface of the timepiece component, or less than the distance between the external edge of the cavity and the external edge of another neighboring cavity (the closest neighboring cavity, if there is a plurality thereof), the smaller of said two distances being taken into consideration, as appropriate. Ultimately, the extent of the zone Z3 does not cover the totality of the surface of the component;

finally, all or part of the external zone Z3 extends over a minimum width starting from the cavity 4, for example being at least 50 μm, and/or does not extend beyond a maximum width, starting from the cavity, in particular being less than or equal to 100 μm, or 200 μm.

Zone Z2 in this case covers the totality of the lateral walls 41 of the cavity 4. As a variant, zone Z2 could partially cover the lateral walls 41.

Zone Z1 in this case covers the bottom 40 of the cavity 4. As a variant, zone Z1 could extend only over a part of the bottom 40.

It would be possible, however, to propose only a single reinforced attachment zone, or two reinforced attachment zones, one being external and the other being internal (the internal zone extending, for example, to the bottom of the cavity or on the lateral walls thereof).

The one or more zones having a reinforced attachment texture are produced in this case by a modification of the surface state, in other words by texturing, of surface zones of the body 3, which brings about an increase in the attachment surface. For example, the texturing may be performed by means of ultra-short pulse laser radiation, in particular femtosecond pulses.

Figure 6:
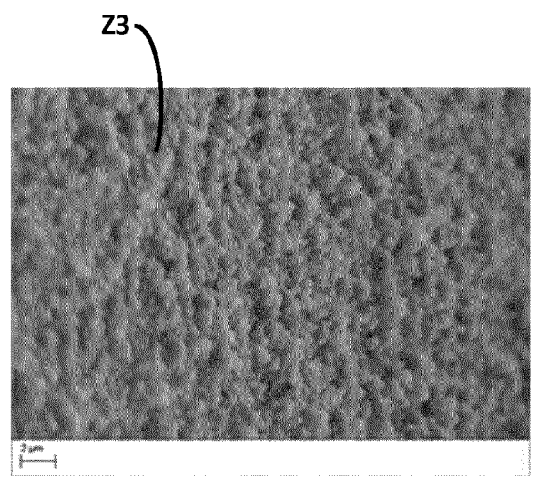
FIG. 6 depicts a view, magnified in the electronic scanning microscope, of the reinforced attachment texture.
Figure 5:
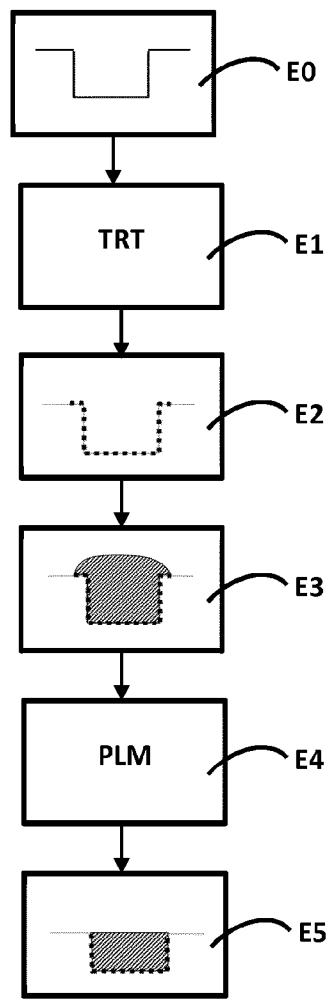
FIG. 5 depicts a flow chart of the steps in the process.

The texturing obtained by a femtosecond pulse laser is not very deep. The relief depth of the reinforced attachment texture is between 0.2 and 20 microns, for example. In addition, the reinforced attachment texture preferably exhibits an average difference in roughness $R_a$ of between 0.4 and 0.6 microns and an average profile height $R_z$ of between 2 and 4 microns, the roughness parameters $R_a$ and $R_z$ being as defined in international standard ISO 4287. Shallow laser texturing makes it possible to maintain the mechanical resistance of the substrate (that is to say of the body 3). A view of a reinforced attachment texture magnified under an electronic scanning microscope is depicted in FIG. 6. The use of femtosecond pulsed laser radiation makes it possible, on the one hand, to obtain a surface state having a finer texturing than that which would be obtained, for example, by sandblasting, and, on the other hand, to minimize, or even to avoid, the thermal effects that would be obtained with longer radiation, for example in the order of a nanosecond. In addition, the exposed surface forming the total adhesion surface that is obtained is much larger than that which would be obtained, for example, by sandblasting.

By way of a purely illustrative example, a femtosecond laser emission device emitting in the infrared range, having a wavelength equal to 1030 nm, and delivering a mean energy greater than 15 μJ, for example equal to 40 μJ, may be used in the target zone with a pulse duration of less than 450 femtoseconds. On a more general level, the laser device that is used is adapted to deliver a power density that is preferably greater than or equal to $18 \times 10^6$ MW.cm$^{-2}$.

In order to texture a target zone (Z1, Z2 and/or Z3), scanning of said zone is carried out with the help of a laser beam having a scanning speed in a first direction described as "longitudinal" and a scanning step width in a second direction described as "lateral", preferably perpendicular or substantially to the longitudinal direction, as described in application WO2013/135703. In the course of scanning, the laser beam scans successive lines that are separated by a distance L' (L' corresponding to the scanning step width), each line containing successive laser impacts of generally circular form, of which the respective centers are separated two-by-two by a distance L. The distances L and L', as well as the focal radius $R_{foc}$ of the laser beam on the target zone make it possible to determine a rate of longitudinal overlapping O, as described in application WO2013/135703, by the following relationship:

$$O = \frac{2 R_{foc}^2 \text{Arcsin}\left(\frac{h_1}{R_{foc}}\right) - h_1 L}{\pi R_{foc}^2} \text{ if } 2 \cdot R_{foc} \geq L, \text{ and } O = 0 \text{ if } 2 \cdot R_{foc} < L$$

$$\text{where } h_1 = \frac{1}{2}\sqrt{4 R_{foc}^2 - L^2}$$

A lateral overlapping rate O' (that is to say in the second lateral direction) is defined in a similar fashion, with L' in place of L in the above relationships.

The longitudinal overlapping rate is advantageously greater than 20% and strictly less than 100%, in other words 20%≤O<100%. The lateral overlapping rate is strictly between 0% and 100%, in other words 0%<O'<100%.

By way of purely illustrative example, the texture depicted in FIG. 6 has been obtained by simple scanning with an average diameter of the laser beam of 27.3 microns, a longitudinal overlapping rate of 54% and a lateral overlapping rate of 76.81.

The longitudinal speed of laser scanning may be between 10 and 3500 mm/s, preferably between 500 and 1000 mm/s. The lateral step width of laser scanning may be between 0.001 and 0.02 mm, preferably between 0.001 and 0.005 mm.

Simple laser scanning, also referred to as "hatch" or "simple hatch" scanning, in a single longitudinal direction, or crossed laser scanning, also referred to as "cross-hatch" scanning, in a first longitudinal direction and then in a second longitudinal direction, separated one from the other by an angle greater than or equal to 10°, for example an angle equal to or substantially equal to 90°, as likewise described in application WO2013/135703, can be carried out on the target zone to be treated.

The method continues with a step E3 of depositing composite material in the cavity 4. In the course of said step E3, the cavity 4 is filled with the composite material 5, in the form of a more or less viscous, or pasty, suspension, by causing the cavity 4 to overflow in such a way as to cover at least partially the external zone Z3.

The depositing step E3 is followed by a polymerization step E4. Said step E4 is carried out, for example, by heating the deposited composite material under moderate pressure and under a controlled atmosphere.

The method continues with a finishing step E5, in the course of which any surplus composite material external to the cavity 4 is eliminated, that is to say the composite material having overflowed from the cavity 4, and the external reinforced adhesion zone texture Z3 is suppressed. Said step E5 is carried out, for example, by polishing, by reworking or by machining.

In the preceding description, the reinforced adhesion zones (Z1, Z2 and/or Z3) are produced by a femtosecond pulse laser. Alternatively, instead of modifying the surface state and the texture of zones Z1, Z2 and Z3 in order to improve the adhesion of the insert, all or part of said zones Z1, Z2 and Z3 could be covered with a connecting layer ensuring a better attachment of the composite material. Said layer could be a standard connecting layer intended to improve the affinity between materials or a porous layer produced, for example, by depositing a mixture of ceramic powder and carbon after injection of the body 3 and before sintering. Such a connecting layer could replace the reinforced attachment texture or could even be added on top of the latter.

In a variant embodiment, the cavity for housing the insert 6 forms a traversing element, through or not. Said cavity comprises, for example, an upper recess, arranged in a face of the component, and extending downwards, in the interior of the component, via a plurality of lateral or vertical hollow feet, which provide additional security of adhesion for the material of the insert. A counterbore provided at the extremity of the foot opposite that which discharges into the upper recess or a foot of frustoconical form (the extremity of smaller section of the frustum of the cone going through into the upper recess), would make it possible to reduce the risk of delamination.

In other variant embodiments, a substrate material other than ceramic may be used. It is possible to use a metal alloy, for example, in particular a steel (for example steel 904L) or a cooper alloy (for example brass), an alloy of 18 ct. gold or even an alloy of Pt950. It is also possible to use a material obtained by electroforming techniques, such as Ni or NiP, or materials that are capable of machining by microfabrication techniques, such as silicon, quartz or diamond. Although the particular example described below relates specifically to the case of a substrate material made of ceramic, it may be applied to any material other than ceramic, by means of any adaptations relating in particular to the technique of forming the body provided with the cavity, under the conditions of texturing, to the nature and to the presence of a connecting layer, under the conditions of polymerization or also under the conditions and/or means of finishing.

Depending on the materials and the conditions of treatment, coloration in the bottom of the recess could be obtained, which modifies the rendering obtained with the composite material. It would be possible, for example, to obtain a white surface in the bottom of the recess by means of an appropriate laser treatment in order to increase the light emission of a composite material possessing light emission or also to obtain a white or black surface in the bottom of the recess by means of an appropriate laser treatment in order to modify the perceived color of the composite material.

It is also possible to implement the method according to the invention on a plurality of occasions, for example in order to produce series of inserts, each made of a different composite material, or in order to produce a second insert made of a second composite material in a first insert made of a first composite material. This makes it possible to combine composite materials having different textures and/or colors and/or functionalities.

The invention also relates to a timepiece component including an insert made of a composite material, housed in a cavity which includes one or a plurality of reinforced adhesion zones extending for all or part of the bottom of the cavity and for at least one part of the one or more flanks of the cavity, in particular the timepiece component 7 obtained according to the method that has been described here.

The invention likewise relates to a timepiece component including an insert made of a composite material, housed in a cavity, and including at least one reinforced adhesion surface of the composite material extending at least partially on the exterior of the cavity. The component concerned may be the component produced by the method described previously in an intermediate state or a component for which the surplus of composite material having overflowed from the cavity may have been retained in order to produce a desired aesthetic effect.

The invention relates, finally, to a timepiece including a timepiece component as defined above.

It would also be possible to envisage the application, in a more general manner, of the previously described production method to the production of a timepiece component produced in a single material and provided with an insert made of a second material distinct from the first material. For example, the insert could be made of a plastic material, of rubber or of some other material.

The invention claimed is:

1. A method of producing a timepiece component provided with an insert made of a composite material, comprising successively:
    forming a body provided with a cavity on one face of the body;
    performing a treatment, in the course of which at least one reinforced adhesion zone is formed on the body;
    depositing composite material, in the course of which the cavity is filled and the reinforced adhesion zone is covered with the composite material;
    polymerizing the composite material;
    wherein at least one portion of the reinforced adhesion zone is situated outside the cavity on a peripheral surface to the cavity.

2. The method as claimed in claim 1, wherein the reinforced adhesion zone is obtained by modification of a surface state of a surface zone of the body so as to obtain a zone having a reinforced attachment texture.

3. The method as claimed in claim 1, comprising performing a finishing, in the course of which any surplus of composite material is eliminated and the at least one portion of the reinforced adhesion zone external to the cavity is suppressed.

4. The method as claimed in claim 1, wherein, in the course of the treatment, at least one reinforced adhesion zone is formed, which zone extends to the interior of the cavity.

5. The method as claimed in claim 1, wherein the external at least one portion of the reinforced adhesion zone is positioned on an edge of the cavity.

6. The method as claimed in claim 1, wherein the external at least one portion of the reinforced adhesion zone surrounds a totality of the cavity.

7. The method as claimed in claim 1, wherein the external at least one portion of the reinforced adhesion zone exhibits a width, perpendicular to an edge of the cavity, of at least 50 μm.

8. The method as claimed in claim 1, wherein the external at least one portion of the reinforced adhesion zone does not cover a totality of a surface of the timepiece component.

9. The method as claimed in claim 8, wherein the external at least one portion of the reinforced adhesion zone is contained within an envelope that is separated from an external edge of the cavity by a distance which is strictly (i) less than a distance between the external edge of the cavity and an edge of the surface of the timepiece component, or (ii) less than a distance between an external edge of the cavity and an external edge of another neighboring cavity, wherein the smaller of the two distances being taken into consideration, as appropriate.

10. The method as claimed in claim 1, wherein all or part of the external at least one portion of the reinforced adhesion zone extends over a maximum width, perpendicular to an edge of the cavity, of less than or equal to 200 μm.

11. The method as claimed in claim 1, wherein the treatment utilizes femtosecond laser radiation.

12. The method as claimed in claim 11, wherein, in the course of the treatment, the zone to be treated is scanned by a laser beam having a laser scanning speed in a longitudinal direction and having a laser scanning step width in a lateral direction, the speed and the step width defining respectively a longitudinal overlapping rate greater than 20% and strictly less than 100% and a lateral overlapping rate which is strictly comprised between 0% and 100%.

13. The method as claimed in claim 11, wherein two laser scans are performed on the zone to be treated defined respectively by two distinct longitudinal directions of scanning which are separated one from the other by an angle greater than or equal to 10°.

14. The method as claimed in claim 2, wherein a depth of relief of the reinforced attachment texture is in a range of from 0.2 to 20 microns.

15. The method as claimed in claim 1, wherein the body provided with the cavity is obtained by injection of a material into a mold.

16. The method as claimed in claim 1, wherein the body is constituted by a material selected from the group consisting of:
a ceramic,
a metal alloy, and
sapphire.

17. The method as claimed in claim 1, wherein the timepiece component is selected from the group consisting of a bezel, a case, a bracelet element, a crown, a dial, an element of a timepiece movement and a blank for a timepiece movement.

* * * * *